Aug. 28, 1956 W. A. BRASS 2,760,740
WING TIP MOUNTED COMBUSTION HEATER
Filed Aug. 1, 1951 2 Sheets-Sheet 1
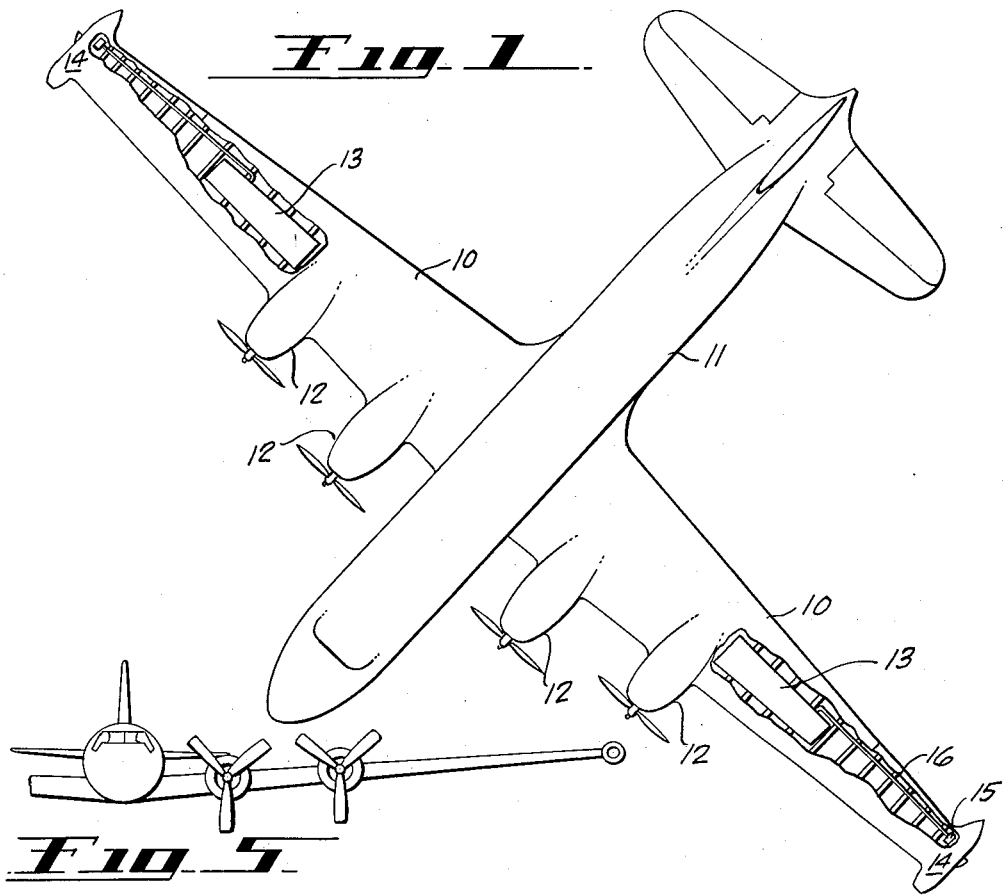
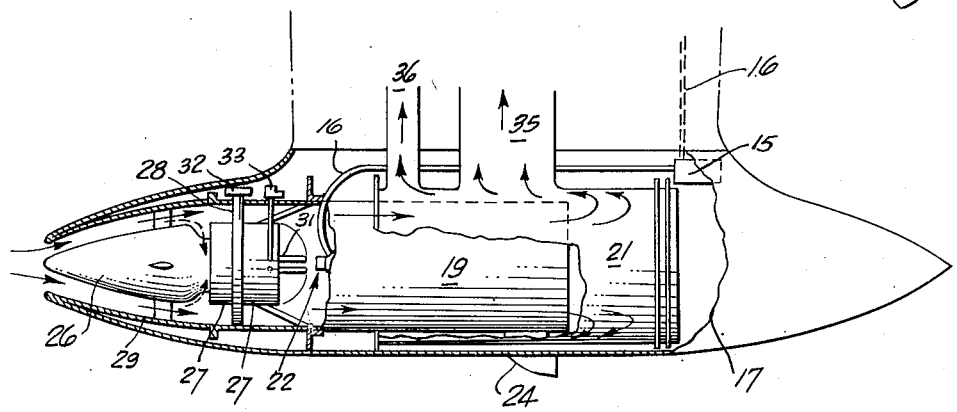
INVENTOR.
WARREN A. BRASS
BY
Edwin Coates
ATTORNEY

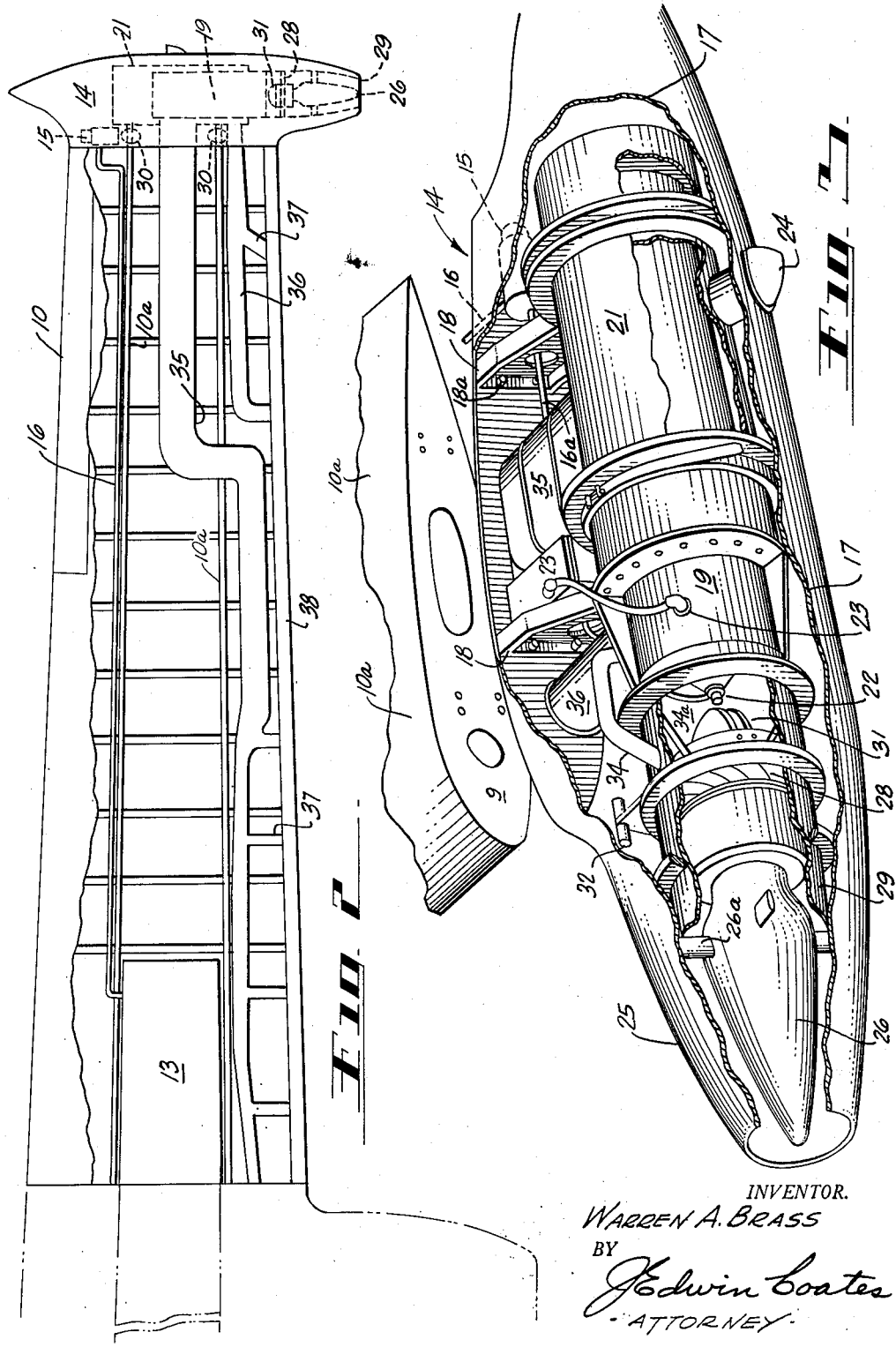

United States Patent Office 2,760,740
Patented Aug. 28, 1956

2,760,740

WING TIP MOUNTED COMBUSTION HEATER

Warren A. Brass, Long Beach, Calif., assignor to Douglas Aircraft Company, Inc., Santa Monica, Calif.

Application August 1, 1951, Serial No. 239,793

10 Claims. (Cl. 244—134)

This invention relates to airplane thermal-air wing de-icing systems and particularly to the means for heating and distributing the air.

In contemporary such systems the heat generators and exchangers are invariably disposed inside the wing framing and near the root of the wing and ahead of and closely adjacent to the main engine-fuel tanks. Since the fuel tanks can not be made absolutely fireproof and since the heaters sometimes "blow out" or sparks fly rearwardly from the heater exhaust onto these tanks occasionally these fuel tanks have been ignited with obvious disastrous consequences.

Access to the heater in such systems is quite difficult as they are mounted deep inside the wing in the centroid region thereof surrounded by a mass of framework, control and service lines and other paraphernalia. Repair, maintenance and replacement work on the heater is thus quite an onerous chore and cannot be done with precision and speed. To replace and substitute heaters for burned out heaters is a major operation entailing layoff time of an airline amounting to a considerable sum extra to the work and material involved.

That portion of a wing which is liable to ice-up quickest and worst is the region lying at and shortly inboard of the wing tip, but in contemporary de-icing systems this is the very portion of the wing that receives from the root-located heaters, the smallest amount of heating air, which further, is relatively cool by this time. For, to develop heat and pressure sufficient to heat the wing tip region even to the degree and quantity to which the wing root region is heated, there would have to be developed such a high temperature and pressure in the region near the fuel tanks where the heater is mounted ordinarily that very heavy, complex, and powerful structures would be necessitated as well as special blowers, special combustion chambers, etc.

Contemporary de-icing systems exhaust their combustion gases rearwardly over the surface of the wing which is damaged thereby. The exhaust may also pass near the fuel tanks, which is obviously an undesirable condition. They also require air intake scoops cut into the leading edge of the wing, which configuration to some extent minimizes the high pressure area on the leading edge and unfavorably alters the pressure distribution curve.

The present invention provides a wing de-icing system in which the source of heat, the main heat exchanger, the controls and all other components except the leading edge heat-exchanger and fuel tanks be entirely outside the airframe itself. It is of such a nature as to dually constitute a removable wing tip, forming an aerodynamic part of the wing, and at the same time is an easily installable and removable unit constituting, as it were, a "heat-package." Lying at the opposite extremes of the wing span, the heat generators import no danger of the fuel in the engine tanks being ignited by any portion of the de-icing system. The heat package presents no extra fire hazard of its own, since it secures its fuel from the engine fuel tanks, which are located far inboard.

Being disposed directly in that area of the wing in which icing occurs first and heaviest, the system applies its greatest heating effects first to this critical area and thereby eliminates all problems involved in generating and transmitting high temperature heating air to the wing tips.

Since it carries its own air inlet directly communicating with the dynamic airstream, the leading edge of the wing is relieved of all deicer airscoops or other discontinuities, whereby the maximum aerodynamic efficiency can be obtained from the wing. Its exhaust is configured to lie on the outermost side of the heat generator and discharges directly to the outside airstream away from all portions of the wing structure or skin so that danger to the wing skin is removed. Obviously, there is no danger of sparks entering the engine fuel tanks.

Being of a relatively high heat producing capacity and for the present purposes of the order of 700,000 B.t.u./hour, the heat exchanger is relatively massive and although streamlined, is somewhat bulky. Therefore, since it is located at the extreme outermost points of the wing span it exerts a gravity moment tending to materially counteract the upward bending moments exerted by the gust-loads during flight, thus preventing undue strain and fatigue of the wing spars and other structure and minimizing flutter and vibration.

Many other aims and accomplishments of the inventive concepts will either be made manifest or become self-apparent hereinafter.

Merely in order to further amplify the inventive concepts and to provide means for reproducing them in one usable form, one of the presently preferred de-icing systems embodying the foregoing and other inventive concepts is, by way of example only, illustrated in the accompanying drawing and described hereinafter in conjunction therewith. However, it is to be definitely understood that the inventive concepts are only limited in the embodiments they can assume by the scope and ambit of the subjoined claims, to which reference is directed for the ascertainment of the invention herein patented.

In these drawings:

Figure 1 is a plan-view of the invention embodied in one of the wide span airplanes for which the invention is particularly suitable;

Figure 2 is a plan-view, on an enlarged scale, of the invention as embodied in that portion of the port wing that lies outboard of the outboard engine nacelle thereof;

Figure 3 is a perspective view, partly broken away, of the present novel article of manufacture detached from the outer terminal of the framed portion of the wing, and Figure 4 is a plan-view thereof, with the wing's adjacent-portion shown in phantom, to better illustrate the flow paths and the control means of the combustion and heating air provided for both grounded and flight conditions.

Figure 5 is a fragmentary front view of an airplane provided with this invention and showing the lateral dihedral of the airplane.

As shown in Figure 1, the invention is of prime importance in modern large-size airplanes having unusually wide span wing halves 10 mounted to a fuselage 11, each wing half supporting engine nacelles 12, the outboard one of which has associated therewith a fuel tank 13 suitably mounted on the internal wing framing. The wing proper, that is, the framed portion of same, terminates abruptly, at a locus disposed outwardly of the fuselage, as a blunt end faced-off by an upright, or substantially vertical, surface 9 which extends for the full chord dimension of this end of the wing.

To obviate the aforestated and other disadvantages and to entail the aforementioned and other advantageous results, instead of providing a de-icing heater fuel tank in the usual location inboard of the outboard nacelle and forwardly adjacent the plurality of fuel tanks usually provided in this location and employing a conventional framed and plan-curved, substantially fixed wing tip section, this invention provides a substantially unitary article of manufacture 14 disposed in place of the usual wing tip and dually constituting a removable wing tip section and a heat generating and heat exchanging instrumentality, as well as serving improved safety, aerodynamic and fatigue inhibiting purposes.

The heat generator in this unit is supplied with fuel from the tanks 13 by means of a fuel pump 15 flow-connected to the tank by a suitable conduit 16.

The unit 14 is comprised of a wing skin 17 dually constituting a housing for the aforesaid heat energy instrumentalities, the heating instrumentalities and the skin together constituting a heat energy package which is removably mounted to the outermost ends of the spars 10a by means of mounting brackets 18 and a plurality of bolts 18a, two of which are shown. The aforesaid configuration thus enables easy repair and maintenance work on the heating units and at the same time enables easy replacement of a new wing tip section should the one become so damaged as to be incapable of performing its aerodynamic and other functions.

Inside the skin and housing 17 is mounted an internal combustion heat exchanger or heated-fluid emitter, the emitted fluid consisting of a portion of the air-stream entering the heat-exchanger and entrained therethrough to the de-icer, the heat-exchanger being substantially of conventional type suitable for supplying heat to a wing leading edge de-icer. Jacketing the rear end of the combustion heater 19, which thus forms the one side of a heat exchanger is a hollow cylinder 21 constituting the other side of a heat exchanger and communicating at its open forward end with ram air.

In the usual manner the internal combustion heater includes a fuel atomizer 22 at its forward end connected by the piping 16a to the fuel pump 15. The heat generating unit also includes an ignition system 23 and an exhaust 24.

The skin and housing 17 is, of course, hollow and entirely of monocoque construction, being tapered forwardly to form an air scoop 25 and tapered rearwardly to complete the aerodynamic conformation necessary for streamlining the combined heat package and wing tip section. Mounted coaxially of the forward portion of the air scoop is a deflector 26 constituting a portion of partition means radially partitioning, in conjunction with the casings of members 19 and 27, the forward portion 25 of the casing means 17 and radially spaced and supported by struts 26a as shown. For induction of combustion and heating air when the craft is on the ground, a convenional ground blower 27 of suitable configuration and power is mounted coaxially rearwardly of the deflector and is supported in the shell of the combustion unit by means of the struts shown. The blower 27 constitutes an air pressure differential creating means for creating a pressure differential that forces de-icer heating air through the heat exchanger when the craft is on the ground. This blower has its intake communicating with the inner, or first, of the two coaxial airstream channels therearound. The outlet or discharge, at the rear end of the blower constitutes the rearward end of said inner channel. When the craft is on the ground, air is deflected by the deflector into the entrance of the ground blower, as shown in dotted lines in Figure 4, and is passed rearwardly through flapper valves 31 which are then maintained in an open position by a suitable actuator 33. Radially surrounding the ground blower is an iris valve 28 for directing air for heating and combustion purposes rearwardly from the deflector during flight at which time it is maintained open by an actuator 32. The aforedescribed air controlling and directing means are encased in an air inlet duct 29. A combustion air pipe 34 leads from the space 34a longitudinally separating the combustion heater and the inlet and valving means to the ignition end of the combustion heater. The usual fuel solenoid valves and heater thermoswitch, not shown, are provided in association with the heater and are, as well as the valve actuators, under the control of the pilot.

Hot air leadout ducts are provided in association with the inboard side of the heat exchanger 21, the larger duct 35 being provided to supply air to the inboard region of the de-icer and the smaller duct 36 furnishing heated air to the outboard portion of the de-icer. Takeoff ducts 37 are provided to connect both ducts with the proper portions of the de-icer 38 on the leading edge of the wing.

On the ground, the flapper valves 31 being open and the iris valve 28 being closed, the blower is actuated by the pilot and forces air into the combustion air pipe through the channel shown, the heat generator heating the air passed around it from the blower in the jacket 21 and sending it to the de-icer through the conduits 35, 36, and 37, the heater exhaust being deflected rearwardly out of the exhaust 24.

One of the advantages of the present construction during the grounded condition of the airplane lies in the fact that ground handling or turning and placing very large airplanes in a hangar or near obstacles, the triple skin concentric cylinder arrangement of the novel wing tip section and the heater package will absorb collisions of the outer portion of the wing with obstacles better than the ordinary wing tip to thereby protect the expensive, complex frame structure of the wing inboard thereof. If badly damaged, it can be as easily removed as a wing tip section and just as easily replaced, access openings 30 being provided in the casing 17 immediately below the brackets 18 to enable ready removal of the fasteners or bolts.

The major advances achieved by the invention, however, become apparent during flight. Under these conditions, it will be observed that the combustion heater, being located at least 35 feet outboard of the nearest fuel tank 13 and being subjected to a high velocity rearwardly directed airstream, cannot communicate fire to the fuel tank under any circumstances, entirely eliminating one of the outstanding dangers of previous de-icing systems. For, upon blowout or conflagration in the combustion device the airstream will blast the flames, sparks and ignited fuel directly rearwardly away from the wing and the tanks therein.

Wings of wide span, such as those with which the present invention is primarily configured, undergo a considerable amount of airload caused upward deflection in flight which, coupled with thermal currents or "bumps," subject the wing to continual upward and downward flexure resulting quickly in fatigue of the spars and other frame elements of the wing. The combined heat package and wing tip of the present invention because of its bulk and considerable weight, with a relatively high moment of inertia, tends to minimize fatigue and flutter by providing an effective downwardly directed gravity moment acting around the wing-hinge or chordwise center line of the outboard wing section. This moment is predeterminable to such a value as to entirely suppress this flexure or flutter or to minimize it to the desired extent.

When, as is usual, the unit is configured and mounted to extend equally above and below the reference plane of the wing, that is, lies in a vertically "mid-mounted" position at the outermost extremity of the wing, it provides many aerodynamic improvements, among which may be mentioned an advantageous increase of the virtual dihedral angle of the wing section, by virtue of the substantial end-plate effect of the package on the wing. This plate dams the outflow of the boundary layer and increases its thickness and hence the total and overall virtual angle of attack, and thus augments the aerodynamic dihedral. Also, in side-slip conditions, it increases the side load and adds a restoring rolling moment. Although the damming occurs equally above and below the wing, the resultants are directed upwardly and helpfully summate. The article also augments the lift-area but not as much as it increases the span. It hence advantageously increases the aspect ratio of the wing. The usual turbulent vortices engendered by the conventional rounded wing tip are minimized by the streamlining effect of the co-axial arrangement of the hollow cylinders, together with the improved fairing due to the substantially ideal streamline shape of the skin 17. Outward flow of the boundary layer—if the layer should happen to be released by virtue of airstream separation at stall angles of the wing—is prevented to a large extent by the damming effect, on the upper and lower surfaces, of the quite considerable vertical extent of the unit. The effectiveness of the ailerons, terminating as they do closely adjacent to the inner end of the article, is substantially increased by virtue of the fact that the "throw" required of them is diminished because of the aforesaid damming effect.

Incorporating its own airscoop, the present article consequently eliminates the multiplicity of airscoops heretofore necessitated in the critical leading edge region of the wing, thereby enhancing the aerodynamic effectiveness thereof.

In the usual deicing heater, the exhaust stack of necessity extends chordwise rearwardly in close adjacency to either the wing fuel tanks, or to the skin-surface of the wing with consequent liability of igniting the former or of burning the latter. It will be observed that the exhaust of the present article lies at the outermost point of the wing structure, thereby obviating this danger.

In large airplanes, particularly, icing is more apt to occur at the wing tip region than in any other portion of the wing and invariably occurs first and thickest there, because of the low velocity of the vortices, resulting in the deposit therefrom of their moisture content in this tip region. The water-droplet "catch-coefficient" of the tip is also higher than that of the rest of the wing and the tip is thinner and colder than any other part of the wing. The article generates and applies the maximum de-icing heat directly in the wing tip. Hence, it acts there as an anti-icer while applying an adequate amount of heat to the wingroot region while concurrently eliminating the aforesaid difficulties.

Consisting, generally considered of a unitary, compact heat-generator and heat-exchanger package enveloped in small compass in a casing 17, the article is in effect a quick-change heat package or "egg," detachably carried at the wing tip in an exposed, fully accessible position and can be readily removed as a unit and replaced by another unit whenever desired.

I claim:

1. In an airplane: a main body-portion, and, extending laterally from each side thereof, a wing having a thermal deicer extending along the inside of its leading edge, the wing abruptly terminating outwardly from said main body-portion in a chordwise extending substantially vertical surface; relatively high capacity heat generating means having airstream heating means surrounding same, disposed in chordwise attitude and in spanwise adjacency to said surface; and casing means, including access means in the one surface thereof adjacent said abutment surface, enveloping both the first said means to form a heat package and laterally, fore-and-aft, and vertically shaped to form the lifting wingtip portion of the wing, said casing means having a portion extending laterally from said heat generating means; means for leading the heated airstream from said heat generating means into said deicer; and means in the lateral extension for attaching the dual heat package and wing tip section to said terminal surface on said wing extremity; whereby to place the initial unexpended maximum heat energy generated in the deicing system in the region of the wing where initial and maximum icing occur, thereby to assure uniform de-icing and anti-icing of the entire leading edge of the wing.

2. In an airplane wing de-icing system of the kind that includes a leading edge thermal de-icer: an internal combustion heater comprising an air-jacket at least partially enveloping said heater and including means for flow-connecting the jacket to the de-icer; an outermost casing enveloping said heater and jacket and terminating forwardly in an airscoop; an inlet air deflector mounted coaxially inside said airscoop and radially dividing same into two radially divergent inner and outer air flow paths; a blower mounted coaxially rearwardly of said deflector and opening forwardly around the deflector into said inner path and opening rearwardly into said air passage; an iris valve peripherally and coaxially surrounding said blower normally in airtight relationship therewith and with said casing and forwardly opening into the outer one of said radially divergent inlet air channels; a flapper valve normally in open position mounted in the rearward opening of said blower; remotely controllable means for opening said iris valve when the aircraft is in flight; remotely controllable means for closing the flapper valves when the aircraft is in flight; and means leading air from the space between said blower and said heater independently to the combustion chamber of said heater.

3. For use in heating and supplying air to an aircraft thermal de-icer, an internal combustion heater-unit, comprising: an internal combustion heater; inner casing means for the heater enveloping the latter at least partially of the length thereof; thermal air conduit means connected with said inner casing means and extending outwardly therefrom for flow-connection to the de-icer; outermost casing means enveloping both the heater and the inner casing and terminating forwardly in an airscoop; inlet-air deflecting means mounted coaxially of said airscoop for dividing the passage in same radially into inner and outer airflow channels; air-pressure establishing means mounted coaxially rearwardly of the deflecting means and spaced longitudinally from said heater and opening forwardly into said inner channel and rearwardly into said airscoop; a first airflow control valve substantially coaxially surrounding said pressure means normally in airtight relationship therewith and opening forwardly into the outer airflow channel; a second airflow control valve mounted normally open in the rearward opening of said air pressure establishing means; remotely operable control means for opening the first-said airflow control valve; remotely operable control means for normally closing said second airflow control valve; and conduit means extending from the space between said pressure means and said heater for leading air from said space to the combustion chamber of the heater.

4. A heater-unit, comprising: a heat generator; first casing means enveloping the generator at least partially of the length thereof; conduit-means extending from said casing means for flow-connection to a heat-utilizing instrumentality; second casing means terminating forwardly in an airscoop; partition means mounted coaxially of the airscoop for dividing same into inner and outer airflow channels; air pressure establishing means spaced apart from said heat-generator and mounted coaxially rearwardly of said partition means, said pressure establishing means having a rearward opening and normally discharging forwardly into said inner channel and opening rearwardly into said airscoop; first airflow control means coaxially surrounding said pressure-means in normally closed position and openable to discharge forwardly into the outer airflow channel; closable second airflow control means mounted normally open in the rearward opening of said air-pressure establishing means; and conduit means extending from the space between said pressure-establishing means and said heat generator for leading air to the combustion zone of said generator.

5. In an airplane, the combination with a main body having a wing extending laterally therefrom and having a main portion abruptly terminating outwardly from said main body, said wing having a propulsion plant located outboard of said main body on said wing and said wing including a thermal de-icing conduit system extending along the leading edge portion of said wing, said wing having an auxiliary fuel-supply means located in said wing considerably outboard of said propulsion plant and inboard of the abrupt outward terminus of said main framed portion; of: a heated-fluid generating and emitting means located beyond the abrupt terminus and at the region of said leading-edge portion in which icing conditions and influences reach nearly their maxima, said generating means being flow-connected to said supply means and connected to said conduit system for flow of heated fluid into said conduit system; whereby to apply the maximum amount and degree of heat of the de-icing system at the outermost end of the framed wing where icing originates and reaches the maximum.

6. As a new article of manufacture: a partially framed and partially monocoque airplane wing, the framed portion having an outer, or tipward, terminus defined by a chordwise extending face; said wing having a thermal de-icing conduit system extending along its leading-edge portion; and a monocoque wing-tip section disengageably engaged to said chordwise-extending face of said framed portion of the wing; heated fluid generating and emitting means in said wing-tip section; and means connecting said generating and emitting means to said deicing conduit system for effecting flow of said fluid to said system so as to thermally de-ice said wing.

7. In a heat-package: a heated-fluid emitter; means on said emitter for flow-connection to a point of use of heated-fluid; casing means of said emitter terminating forwardly in an air intake; partition means arranged coaxially in the forward portion of said casing means so as to divide same into first and second coaxial airflow channels; air pressure differential creating means mounted coaxially rearwardly of said partition means, said pressure-differential creating means having an intake opening into the forward portion of the first-said one of said two coaxial channels and having an outlet opening into the rearward portion of the first-said channel; first, normally closed airflow control means coaxially surrounding said pressure-differential creating means and being openable to discharge forwardly into the second of said airflow channels; closable, normally open, second airflow control means mounted in the rearward opening in said pressure-differential creating means; and conduit means flow-communicating at the one end thereof with the region rearwardly adjacent said pressure-differential creator and flow-communicating at the opposite end thereof with said heated-fluid emitter for leading combustion air to said heated-fluid emitter so as to enable heat-generation therein.

8. In an airplane: a main body; a framed wing proper extending laterally from each side thereof, the wing proper terminating outwardly from the body as a substantially upright or vertical, chordwise-extending surface; a thermal de-icer extending along the leading edge of the wing; an airstream heating unit disposed spanwise adjacent said surface and extending mainly chordwise; unit-packaging means enveloping said heating-unit and lying laterally outwardly entirely beyond said wing proper, said packaging means including a portion extending laterally inboardwardly from the heating unit; means in the extension aforementioned for attaching the heat-package to said upright surface; and means for establishing flow of heated airstream from said heat package to said de-icer; whereby to provide the maximum heat source at the critical region of the wing relative to icing.

9. In an airplane: a main body; a framed wing proper extending laterally from each side thereof, the wing proper terminating outwardly from the body as a substantially upright or vertical, chordwise-extending surface; a thermal de-icer extending along the leading edge of the wing; an airstream heating unit disposed spanwise adjacent said surface and extending mainly chordwise; unit-packaging means enveloping said heating-unit and lying laterally outwardly entirely beyond said wing proper, said packaging means including a portion extending laterally inboardwardly from the heating-unit; said packaging means being aerodynamically conformed laterally, vertically, and chordwise to constitute an auxiliary lift-surface lying entirely outwardly beyond the wing proper, said auxiliary lift-surface constituting the critical icing region of the airplane and containing the maximum heat generated in the de-icing system; means in said auxiliary lift-surface for attaching same to said upright surface; and means for establishing flow of heated airstream from said heat package to said de-icer; whereby to provide means for conferring lift upon the heating-unit group.

10. In an airplane: the combination with a main body having a wing including a wing-root, said wing extending laterally from said body and having a main portion terminating outwardly of said main body in a blunt end; said wing having a thermal de-icing conduit system extending along the leading-edge portion of the wing substantially from the wing root to said blunt end; of fluid-heating means disposed beyond said blunt end and united to same to lie in that portion of the assembly of wing-proper where icing occurs first and most; and conduit means connecting said fluid-heating means to said conduit system for flow of heated fluid thereto from said fluid-heating means; whereby to effect application of heat to said leading edge with the maximum available heat applied first to the spanwise outer region of the wing where same normally ices first and most.

References Cited in the file of this patent

UNITED STATES PATENTS

| 1,879,717 | Sikorsky | Sept. 27, 1932 |
| 1,924,122 | Jones | Aug. 29, 1933 |
| 2,264,297 | Clay | Dec. 2, 1941 |
| 2,374,441 | Loufek | Apr. 24, 1945 |
| 2,421,699 | Johnson | June 3, 1947 |
| 2,425,630 | McCollum | Aug. 12, 1947 |
| 2,498,283 | Lee | Feb. 21, 1950 |
| 2,537,369 | Ostroff | Jan. 9, 1951 |
| 2,547,226 | Michael | Apr. 3, 1951 |
| 2,584,961 | Beck et al. | Feb. 5, 1952 |

FOREIGN PATENTS

| 872,789 | France | Feb. 23, 1942 |

OTHER REFERENCES

"Flight," page 319, September 21, 1944.
"Aviation," pages 160 and 265, August 1944.
"Aviation News," page 11, November 11, 1946.
"Western Flying," page 35, January 1949.